Dec. 12, 1972 A. H. BOBECK ET AL 3,706,082

SINGLE WALL DOMAIN GENERATOR

Filed Feb. 22, 1972

United States Patent Office 3,706,082
Patented Dec. 12, 1972

3,706,082

SINGLE WALL DOMAIN GENERATOR

Andrew Henry Bobeck, Chatham, and Irynej Danylchuk, Morris Plains, N.J., assignors to Bell Telephone Laboratories, Incorporated, Murray Hill, N.J.

Filed Feb. 22, 1972, Ser. No. 227,966
Int. Cl. G11c *11/14, 19/00*
U.S. Cl. 340—174 TF 8 Claims

ABSTRACT OF THE DISCLOSURE

Magnetic domains are generated during high speed operation of a single wall domain arrangement by a domain shuttling generator operative to selectively separate a portion of a seed domain for transfer to a propagation channel.

FIELD OF THE INVENTION

This invention relates to magnetic storage arrangements and more particularly to such arrangements in which information is stored as patterns of single wall domains.

BACKGROUND OF THE INVENTION

Pat. 3,534,347 of A. H. Bobeck issued Oct. 13, 1970, describes the movement of single wall domains along channels defined in a layer of magnetic material by a pattern of magnetically soft material coupled to the layer. Movement of domains is in response to a magnetic field reorienting (viz: rotating) in the plane of the layer. Arrangements of this type are called "field-access" types because operation is in response to the in-plane field.

Copending application Ser. No. 160,841, filed July 8, 1971 for A. H. Bobeck and H. E. D. Scovil describes a field-access, single wall domain arrangement in which a plurality of elements of the pattern of magnetically soft material which define a single stage of a propagation channel are spaced closely together—distances small compared to the diameter of a domain moved in the domain layer. "Fine-grained" patterns of this type have the unique capability of moving domains of widely differing sizes simultaneously.

A. J. Perneski, Pat. 3,555,527 issued Jan. 12, 1971, describes a domain input arrangement where a seed domain moves about the periphery of a magnetically soft disk (generator) at the input of a channnel-defining pattern. The seed domain follows magnetic poles which move about the periphery as well as poles moving outwardly along the channel in response to the in-plane field. As the in-plane field reorients the domain stretches and finally splits into two in an operation which appears as "taffy pulling" when viewed through a microscope under polarized light.

A typical stage of a domain propagation channel has a length of about three domain diameters. The periphery of a domain generator is typically much longer than three domain diameters. The reason for relatively large size of the generator is to reduce the demagnetizing fields on the seed domain thus ensuring its continued existence during operation. It should be apparent then that the seed domain has to move relatively quickly to complete one traversal of the periphery of the generator in the time a domain can move one stage of the channel. At increasingly high speeds, of course, the generator eventually fails to keep up with domain movement.

BRIEF DESCRIPTION OF THE INVENTION

The invention is based on the recognition that a pattern of the fine-grained type described above can be employed to define two closely spaced positions between which a domain is shuttled in response to a cyclically reorienting in-plane field and that a shuttled domain can be split into two domains one for transfer to an adjacent propagation channel and one for return as a seed domain to the alternative position where its initial geometry is reestablished from energy derived from the familiar bias field which maintains domain size relatively constant in the domain layer.

In one specific embodiment of this invention a fine-grained pattern defines a domain generator at the input of a multistaged propagation channel defined also by a fine-grained pattern of elements forming a chevron design in each stage. The pattern at the generator is in the form of closely spaced magnetically soft linear strips inclined at an angle to the axis of domain movement and spaced apart one stage from the first stage of the channel. A hairpin-shaped electric conductor couples the domain layer at the generator being operative to separate into two, when pulsed, a seed domain being shuttled back and forth at the generator in response to a rotating in-plane field. Specifically, the conductor, when pulsed operates to expand one of the resulting domains to encompass the first stage of the propagation channel.

DETAILED DESCRIPTION

Figure 1:
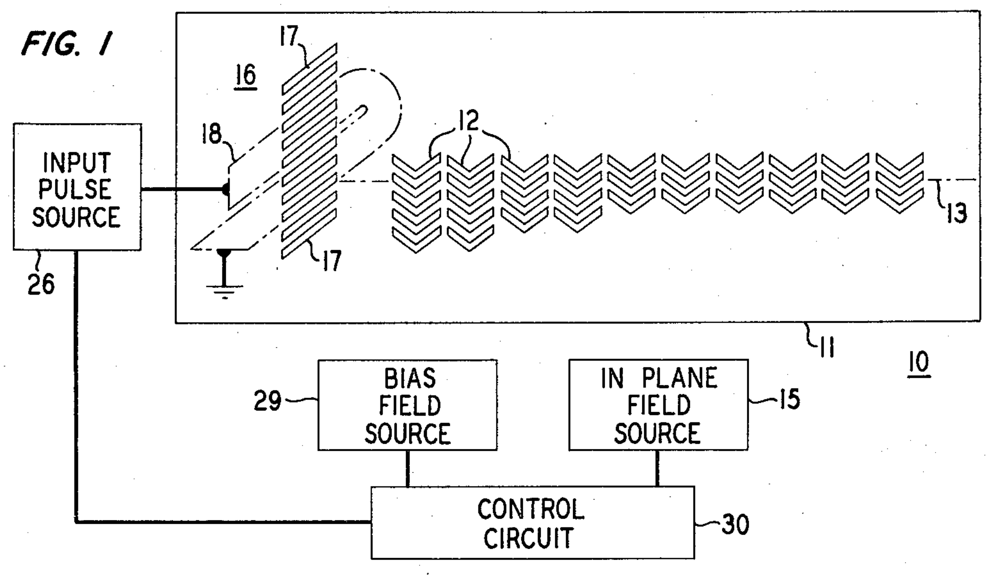
FIG. 1 is a schematic representation of a single wall domain arrangement in accordance with this invention.

FIG. 1 shows a single wall domain arrangement 10 including a layer 11 in which single wall domains can be moved. A repetitive chevron pattern 12 is shown defining a representative chanel along which domains move to the right, as viewed, in response to a magnetic field rotating counterclockwise in the plane of the layer 11. The in-plane field is supplied by a now familiar source represented in FIG. 1 by block 15.

The chevron pattern extends to the right, as viewed, from an input area 16 in FIG. 1 at which domains are generated for movement along channel 13. The input area comprises a pattern of magnetically soft strips inclined at an angle to the axis of channel 13 and occupying the space of one stage (viz: the length occupied by one chevron pattern).

A hairpin-shaped electrical conductor 18 is coupled to layer 11 at the input area and is also inclined parallel to elements 17. It will be noticed from the figure that the elements 17 are spaced apart from the adjacent chevron pattern. This spacing is, illustratively, equal to one stage. It will also be noticed that conductor 18 extends into this spacing.

Figure 2:
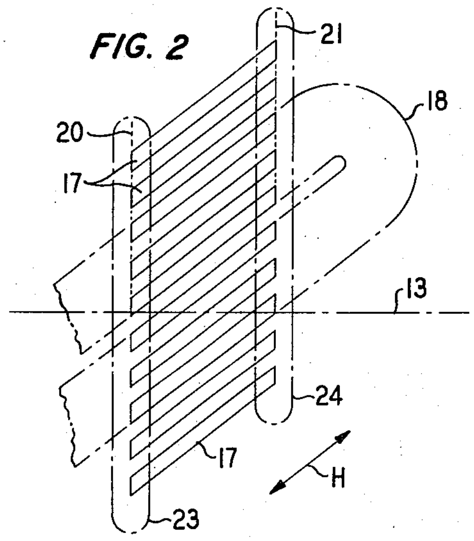
FIGS. 2, 3 and 4 are schematic representations of portions of the single wall domain arrangement of FIG. 1 showing the disposition of magnetic domains therein during an input operation.

The elements 17 are inclined with respect to the channel axis to obtain space for the formation of relatively long elements in order to obtain increased pole strength for a given drive (in-plane) field while defining as small a distance between first and second domain positions between which a seed domain is shuttled by pole variations in the elements as the in-plane field rotates. FIG. 2 shows the two positions 20 and 21 between which a seed domain 23 is shuttled. Although the seed domain is displaced, somewhat, laterally with respect to the channel axis due to the incline, the spacing between positions 20 and 21 is measured along the axis.

FIG. 2 shows (seed) domain 23 elongated vertically into an oblate form. The reason for this is that when the in-plane field is directed to the left and parallel to elements 17 as indicated by the double-head arrow H in the figure, strong poles are generated at the left ends of the elements. For a given bias field, a domain at a corresponding nominal diameter extends along the line of poles in the form shown.

As the in-plane field next rotates counterclockwise to the right the poles are generated at the right end of elements 17 and the seed domain moves to the corresponding position shown occupied by domain 24 in the figure. For each cycle of the in-plane field, the seed domain shuttles pack and forth between positions 20 and 21 in FIG. 2. As the frequency of the field increases and the mobility of layer 11 becomes limiting, the seed domain virtually oscillates at a position intermediate positions 20 and 21 never really reaching either. It is important to note, in any case, that the seed domain moves approximately the distance of one stage for any cycle of the in-plane field and so is operative at any speed at which domains can be moved along channel 13.

But the actual generation of data domains from the shuttling seed domain in FIG. 2 is responsive to an input pulse applied to conductor 18. The conductor is connected to an input pulse source represented by block 26 in FIG. 1 which applies input pulses to it. The conductor is aligned parallel to elements 17 in order to avoid generating poles in those elements when an input pulse is applied. The polarity of the input pulse is selected to generate a field to collapse domains within the loop of the hairpin. If positive domains are taken to have flux directed upward out of the figure towards the viewer, the field within the loop of the hairpin is directed downward or negative, a direction parallel to the direction of the bias field which constricts domains to the nominal operative diameter.

Figure 3:
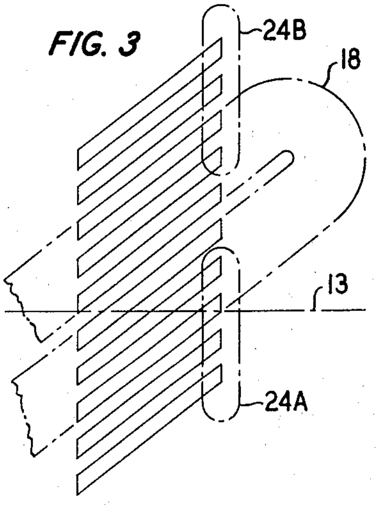

FIG. 3 shows the seed domain 24 divided into two domains 24A and 24B when conductor 18 is pulsed at a time when the in-plane field is oriented to the right and upward as indicated by arrow H of FIG. 2. Although the resulting field within the loop of the hairpin is negative, the field outside the loop is positive fixing the position of domains 24A and 24B at the edge thereof and permitting the domains to expand to the right along that edge. Domain 24A, particularly, is enlarged to closely approach the left edge of the elements of the first stage of the propagation channel as shown by the domain 24A in FIG. 4.

Figure 4:
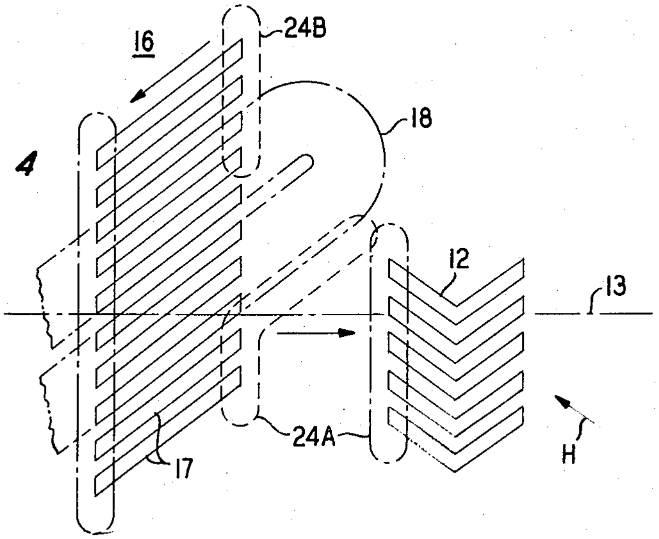

As the in-plane field next reorients in a direction represented by arrow H in FIG. 4, domain 24A latches onto the poles generated at the left ends of the adjacent chevron pattern 12 and thus transfers to the first channel stage. Meanwhile, domain 24B moves to the left where it expands to its original geometry as shown in FIG. 4 when the pulse on conductor 18 terminates. The bias field which supplies the energy for this expansion of domain 24B is supplied by a bias field source represented by block 29 of FIG. 1.

Sources 15, 26, and 29 are connected to a control circuit represented by block 30 of FIG. 1 for activation and synchronization. The various sources and circuits may be any such elements capable of operating in accordance with this invention.

Domain generation in accordance with this invention can be seen to involve the shuttling of a seed domain between two positions closely spaced along an axis of propagation defined by a fine-grained pattern of elements capable of shuttling domains of widely differing geometries (input domains 23 and 24B) in response to a rotating in-plane field. Domain generation herein also involves a conductor 18 pulsed to divide the seed domain into two domains one of which is expanded to an adjacent stage of a propagation channel in response to the field of that pulse.

The timing of the pulse in conductor 18 with respect to the in-plane field does not seem to be critical, the seed domain being cut adequately whether it is in position 20 or 21 or intermediate the two positions when the pulse occurs. The duration of the pulse, on the other hand, is such that it overlaps the time during which the in-plane field is directed in a manner to move the seed domain to position 21. The pulse is terminated when the in-plane field is oriented to generate attracting poles at the neighboring edge of the elements of the first stage of the propagation channel.

The number of magnetically soft strips in the generator can be increased and/or lengthened to ensure proper domain positioning and pole strength for operation as described. An increase in strip length increases the pole strength without necessarily increasing the spacing between positions (20 and 21) between which a seed domain is shuttled as has been mentioned before. When a seed domain is cut at high speeds, moreover, it is required that one of the resulting domains becomes the seed domain for the next subsequent operation. That domain must experience an adequate pole strength in a suitable position in order to be reconstituted as a seed domain. An increased number of strips merely defines an adequate position for the domain above the hairpin wire 18 to accept that domain after the cutting operation.

The spacing of one stage between elements 17 and the chevron pattern 12 in FIG. 4 is to avoid the capture of the (incipient) seed domain 24B by poles generated in that chevron pattern during operation and to ensure that only a pulse in conductor 18 is operative to transfer a domain to the propagation channel. In this manner, a pattern of pulses in conductor 18 establishes the domain pattern and thus the data stream in channel 13.

In an illustrative example in accordance with this invention, domains having operating diameters of 8 microns were maintained by a bias field of 60 oersteds in an epitaxially grown film of YGdTm garnet on a substrate of GdGa garnet. An in-plane field of 30 oersteds, rotating at frequencies in excess of 100 kilocycles produced a domain pattern in response to pulses of 200 milliamperes applied to conductor 18 of FIG. 1 The pulses were of 1 microsecond duration and were applied when the in-plane field moved the seed domain to position 24. A pattern of five V-shaped permalloy elements were used per stage. Adjacent elements were on 20 micron centers and were 2 microns wide. Elements 17 were of bar geometry and were inclined at an angle of about 45 degrees with the channel axis. The pattern of elements 17 and the chevron pattern were of magnetically soft permalloy.

What has been described is considered only illustrative of the principles of this invention. Accordingly, numerous other embodiments can be devised by one skilled in the art without departing from the spirit and scope thereof.

What is claimed is:

1. A magnetic arrangement comprising a layer of material in which single wall domains can be moved along an axis, a first pattern of elements coupled to said layer for moving a seed domain back and forth along said axis between first and second positions in response to a magnetic field cyclically reorienting in the plane of said layer, said pattern being adapted for moving domains of different sizes, means responsive to a first signal for separating into a first and second domain a seed domain moved to said second position, said last-mentioned means being operative to enlarge said first domain to include a third position, and means for moving said first domain from said third position responsive to said in-plane field.

2. A magnetic arrangement in accordance with claim 1 wherein said means for moving comprises a repetitive, fine-grained pattern of magnetically soft elements and wherein said in-plane field is operative to move said second domain to said first position.

3. A magnetic arrangement in accordance with claim 2 wherein said repetitive pattern comprises magnetically soft elements which form a chevron pattern in each stage of a multistage propagation channel.

4. A magnetic arrangement in accordance with claim 3 wherein a first stage of said multistage propagation channel is separated from said first pattern a distance of one stage.

5. A magnetic arrangement in accordance with claim 4 wherein the elements of said first pattern comprise magnetically soft linear strips aligned at a first angle to the axis of said channel.

6. A magnetic arrangement in accordance with claim 5 including a hairpin-shaped conductor coupled to said layer at said first and second positions, said conductor being operative when pulsed to cut a domain in one of said positions and for extending one of the resulting domains into close proximity with a portion of said first stage.

7. A magnetic arrangement in accordance with claim 6 wherein said conductor extends across the separation between the elements of said first pattern and said first stage.

8. A magnetic arrangement comprising a layer of material in which single wall domains can be moved, a pattern of elements for defining in said layer a multistage channel for moving domains along an axis from an input to an output stage in response to a magnetic field reorienting in the plane of said layer, said pattern in each of said stages being fine grained and operative to move domains of different sizes, said pattern at said input stage being of a geometry to move a domain back and forth along said axis between first and second positions in response to said in-plane field and being disposed such that a domain therein does not move to the next subsequent stage in response to said in-plane field, and an electrical conductor coupled to said layer at said input stage adapted to separate into first and second domains a domain at said input stage and to transfer one of said separate domains to said next subsequent stage when pulsed.

References Cited

UNITED STATES PATENTS

| | | | |
|---|---|---|---|
| 3,541,534 | 11/1970 | Bobeck et al. | 340—174 TF |
| 3,611,331 | 10/1971 | Bonyhard | 340—174 TF |
| 3,633,185 | 1/1972 | Danylchuk | 340—174 TF |

JAMES W. MOFFITT, Primary Examiner

U.S. Cl. X.R.

340—174 HP, 174 SR